United States Patent [19]
Sanner

[11] 3,848,616
[45] Nov. 19, 1974

[54] FLUID FLOW CONTROL SYSTEMS
[75] Inventor: George E. Sanner, Cypress Hill, Md.
[73] Assignee: Santron Corporation, Towson, Md.
[22] Filed: July 18, 1972
[21] Appl. No.: 272,793

Related U.S. Application Data

[60] Continuation-in-part of Ser. No. 18,829, Feb. 12, 1970, abandoned, which is a division of Ser. No. 456,787, May 18, 1965, Pat. No. 3,500,844.

[52] U.S. Cl............. 137/78, 73/304 R, 137/392, 200/61.05, 307/118
[51] Int. Cl................... H01h 35/18, G05d 9/12
[58] Field of Search........ 200/61.05, 190; 73/304 R; 137/78, 386, 389, 390, 392; 307/118

[56] References Cited
UNITED STATES PATENTS

| | | | |
|---|---|---|---|
| 1,285,986 | 11/1918 | Grafford | 200/190 |
| 1,346,898 | 7/1920 | Kingsbury | 137/392 |
| 2,213,961 | 9/1940 | Hunter | 137/392 X |
| 2,627,015 | 1/1953 | Hackman | 137/390 X |
| 2,708,945 | 5/1955 | Hirsch | 137/392 |
| 2,735,907 | 2/1956 | Inman | 200/61.05 |
| 2,751,915 | 6/1956 | Roberts | 239/304 X |
| 3,118,606 | 1/1964 | Rotunda | 239/63 |
| 3,212,714 | 10/1965 | Davis | 239/63 |
| 3,334,651 | 8/1967 | Clearman | 137/387 X |
| 3,339,578 | 9/1967 | Smith | 137/392 |
| 3,359,766 | 12/1967 | Haas | 137/389 X |

Primary Examiner—Martin P. Schwadron
Assistant Examiner—Richard Gerard
Attorney, Agent, or Firm—Strauch, Nolan, Neale, Hies & Kurz

[57] ABSTRACT

A system for controlling the flow of fluid to and/or from a receptacle or reservoir which has a timed mode of operation and manual and demand modes, one or more level responsive controls, and at least one control for overriding the level responsive control or controls.

13 Claims, 7 Drawing Figures

FLUID FLOW CONTROL SYSTEMS

This application is a continuation-in-part of application Ser. No. 18,829 filed Feb. 12, 1970 (now abandoned), which is a division of application Ser. No. 456,787 filed May 18, 1965 (now U.S. Pat. No. 3,500,844).

The present invention relates to control systems and, primarily, to systems for automatically controlling the flow of fluids into and/or out of reservoirs or receptacles such as swimming pools and automatic washer machines of various types.

One of the more important advantages of my invention is that it is capable of economically and efficiently controlling the amount of sanitary water used in swimming pools and automatic washer machines of various types.

Sanitary water supplies were originally intended for drinking and cooking, but are now widely used for other purposes including cleaning, lawn sprinkling, the filling of priviate swimming pools, the washing of clothes and automobiles, and many others. For example, aboveground swimming pools for private homes with capacities of up to 16,000 gallons have mushroomed in popularity in the last decade as plastic liners and filter systems have been improved and reduced in price. This has resulted in such a great demand for additional sanitary water that the conservation of available supplies has become extremely important.

Accordingly, accurate control of the amount of water used is absolutely essential to insure the most efficient use of available supplies by the maximum number of people.

However, there are few fluid control systems for private swimming pools and the like, despite the great demand for water. Accordingly, one important object of this invention is to provide novel improved systems for automatically conrolling fluid levels in reservoirs such as home swimming pools.

Numerous automatic fluid control systems have heretofore been proposed for various purposes. U.S. Pat. Nos. 3,613,714; 3,233,619; 3,118,606; 3,599,666; 2,588,677; 2,488,817; 3,334,651; 3,111,017; 3,359,766; 3,362,427; 2,213,961; and 2,708,945 all disclose automatic liquid level control systems in which provision is made for discontinuing liquid flow when some predetermined condition is achieved. However, systems of this type heretofore known have a number of disadvantages.

First, for the most part, they employ a volumetric type of switching in which a specific volume of liquid is utilized to perform the switching function. A primary disadvantage of these switching systems is the problem of "bleeding," i.e., of releasing the captured fluid required by the switch for proper operation.

To achieve precision switching, large volumes of liquid are required so that there will be a positive switching action. Unfortunately, this impairs rapid switching due to the time required for the "volumetric" switch to release the contained liquid and prepare for the next switching operation.

Furthermore, if the design is altered to provide easy bleeding or escape of the volumetric liquid, accumulation of the fluid becomes more difficult; and the switching time constant becomes longer with resulting inaccuracy. If bleeding is made more difficult to improve switching response time, the time for the switch to recover is increased, reducing the effective switching repetition rate.

The problem of volumetric system bleeding impairs accuracy, and schemes have been devised to circumvent this problem by causing the volumetric cavity or chamber to be freed of liquid on a basis entirely independent of liquid level. In the case of an automatic washer, for example, this may be done each time the door is opened or closed. Such arrangements are in general unsatisfactory and cause more problems than they solve.

Also, volumetric systems usually effect electrical switching by mechanical actuation. The actuators are generally multistaged in that liquid is entrapped in a hydraulic chamber which, in turn, compresses air entrapped in the chamber. This typically causes an elastic diaphragm to produce a mechanical motion which provides the necessary translation for finally closing or opening a pair of electrical contacts. The complexity and opportunity for failure in such arrangements as well as their initial costs and maintenance requirements make them undesirable.

In some cases efforts have been made to alleviate the problems discussed above by employing high capacity electrolytic switching devices in which single or concentric conductor volumetric gap switches are used. Even these systems, however, are slow in electrical switching frequency and inaccurate regarding recycle time, and are complicated and necessarily expensive to manufacture and maintain.

It is accordingly another important object of the present invention to provide novel automatic fluid control systems which are capable of producing instantaneous control over the flow of fluid into or from a reservoir in accordance with predetermined conditions and which do not have the above enumerated disadvantages of previously known flow control systems.

A further important and related object of the present invention is to provide flow control systems which have high switching recycle rates without regard to the characteristics of the fluid or the reservoir in which it is stored.

To achieve the foregoing and other important goals, the novel, automatic fluid flow control systems provided by the present invention employ a "planimetric" electronic switch rather than the volumetric electrolytic switches already described. Planimetric switches provide instant switching upon being contacted by the first drop of liquid. Further, they can be so designed that operation is achieved in the presence of certain saturated vapor environments as well as in the presence of liquids, thus greatly extending the utility of fluid control systems.

The automatic fluid control system provided by the present invention can be employed to maintain the level of a fluid in a reservoir at a given predetermined level. If the fluid level falls below the predetermined level (e.g., by evaporation from a swimming pool), additional fluid is caused to flow into the reservoir to the extent required to raise the level of the liquid to the predetermined level. This inflow may be made to occur either during a predetermined clock interval or automatically as required as well as manually.

In addition, if the level in the reservoir exceeds the predetermined level (e.g., due to heavy rainfall on an outdoor swimming pool), fluid or liquid can be caused to flow from the reservoir to restore the level in the reservoir to the predetermind level.

The use of planimetric switches permits the inflow and outflow of fluids to be instantaneously initiated and terminated to thereby maintain the fluid in a reservoir at a predetermined level without regard to the type of fluid or the type of reservoir.

In my invention, the control of both inflow and outflow operations as described above can be overriden by additional planimetric switches in envionments other than the reservoir or receptacle. For example, in a typical swimming pool, inflow to restore water to the predetermined level can in this manner be interrupted during periods of natural rainfall. Upon cessation of the rainfall, inflow will resume until the fluid reaches the predetermined level if in the automatic mode or until the end of the preset clock interval, if in a clock or timed mode of operation.

Similarly, one or more additional planimetric switches can be used to make the flow into one or plural receptacles to provide a given level of fluid therein dependent upon the level of fluid in another receptacle or receptacles.

One or more additional planimetric switches can in like manner often be employed to advantage in outflow operations. For example, where two connected reservoirs are being drained simultaneously, a second planimetric switch in the second reservoir can be used to cause outflow from the second reservoir to reduce the liquid therein to a given level after the first reservoir has been emptied to a predetermined level if in the automatic mode or until the end of a preset clock interval if in the clock mode of operation.

It is obvious that my novel automatic fluid flow control systems are highly flexible and that they may be used to supply fluids to and remove them from a variety of reservoirs under a wide variety of conditions and environmental circumstances as well as to combine and separate liquids of diverse character.

As suggested above, this versatility is in part made possible by the use of planimetric switches. Since the planimetric switch is not volumetric in nature, its operation is not dependent upon long time constants. Instead, it operates almost instantaneously. Furthermore, it is quite independent of the nature of the liquid under control. Accordingly, plural flow operations can be initiated almost simultaneously and can be made to proceed at the same time, thereby permitting fluids and liquids to be combined or mixed.

A further advantage of the planimetric switch is that it can be produced by inexpensive printing or chemical etching techniques, while permitting conductor separation tolerances to be maintained within accuracies on the order of thousandths of an inch. This economy of manufacture and switch design flexibility and the resulting precision in operation are advantages not possessed by the heretofore employed volumetric/electric switches.

Another advantage is that the planimetric switch may be rapidly printed in any desired configuration on a fiber or other non-conductive base. Further, multiple switches may be printed upon a common base, if desired.

Also, the planimetric switch just described has no moving parts; is assembled from small amounts of inexpensive materials; and is small, light, and compact because it does not employ liquid collecting containers or other bulky components. Further, the planimetric switch may be designed with tapered precision electrode gaps and quickly manufactured by simple printing processes. These unique tapered switches permit accurate switching in the interface or sludge zones that between two fluids of different characteristics in a common reservoir. In this application planimetric switches are uniquely useful since the tapered gap integrates instantly the sum of all currents flowing between the electrodes. Two pairs of tapered gap planimetric switches, differentially spaced in depth, enable precision measurements of interface zone positions to be made since the interface position is a function of the difference in the current flow through the two switches.

Because of the planimetric switch and other novel features, the automatic fluid flow control systems of the present invention are economical to manufacture, compact, reliable, and rugged. Additionally, they have a greatly reduced electrical shock hazard in comparison to typical heretofore available flow control systems.

Also, the systems of the present invention have a much faster reaction time than those heretofore known and are therefore capable of initiating flow more quickly.

Furthermore, because only a minimum of fluid is required to close the planimetric switch and as no fluid is retained by the switch, switch opening is virtually instantaneous as the fluid level recedes; and the switch is then in a condition in which it can initiate another operating cycle; that is, there is virtually no recovery period.

The systems of the present invention are extremely simple and can be easily and quickly installed by a homeowner. A further advantage of the systems disclosed herein is that their control units may be readily used to control auxiliary rain alarms, steam and gas alarms, booster liquid and vacuum pumps, and other ancillary items.

From the foregoing it will be apparent that further important objects of the present invention include the provision of novel fluid level control systems of the type hereinbefore described, which:

1. Are more simple, more compact, more reliable, and less expensive to manufacture than those heretofore known.

2. Have faster reaction times and are more versatile than prior art systems.

3. Do not require adjustment.

4. Are completely automatic.

5. In conjunction with the foregoing objects, employ one or more planimetric switches which are completely devoid of moving parts and do not employ the liquid accumulating containers used in prior art systems.

6. Provide instantaneous control and permit plural flow operations to be carried on simultaneously, thereby providing a unique technique for combining fluids.

7. Have electrical components that operate on low voltages and greatly lessen the possibility of electrical shock.

8. Include control units that are readily adaptable to other applications requiring a combination of fluid level sensing switches, reservoirs, and pumps, including operation in saturated gaseous environments.

9. Have various combinations of the foregoing and other desirable attributes.

Yet another important object of this invention is the provision of novel improved fluid flow control systems which can be readily adapted to control flow and/or pump operations in response to time and one or more other parameters such as precipitation, pressure, humidity, ionization, fluid level and the like.

Additional objects, further novel features, and other advantages of the present invention will become more fully apparent from the appended claims and from the ensuing detailed description and discussion of the present invention as it proceeds in conjunction with the accompanying drawing in which:

Figure 1:
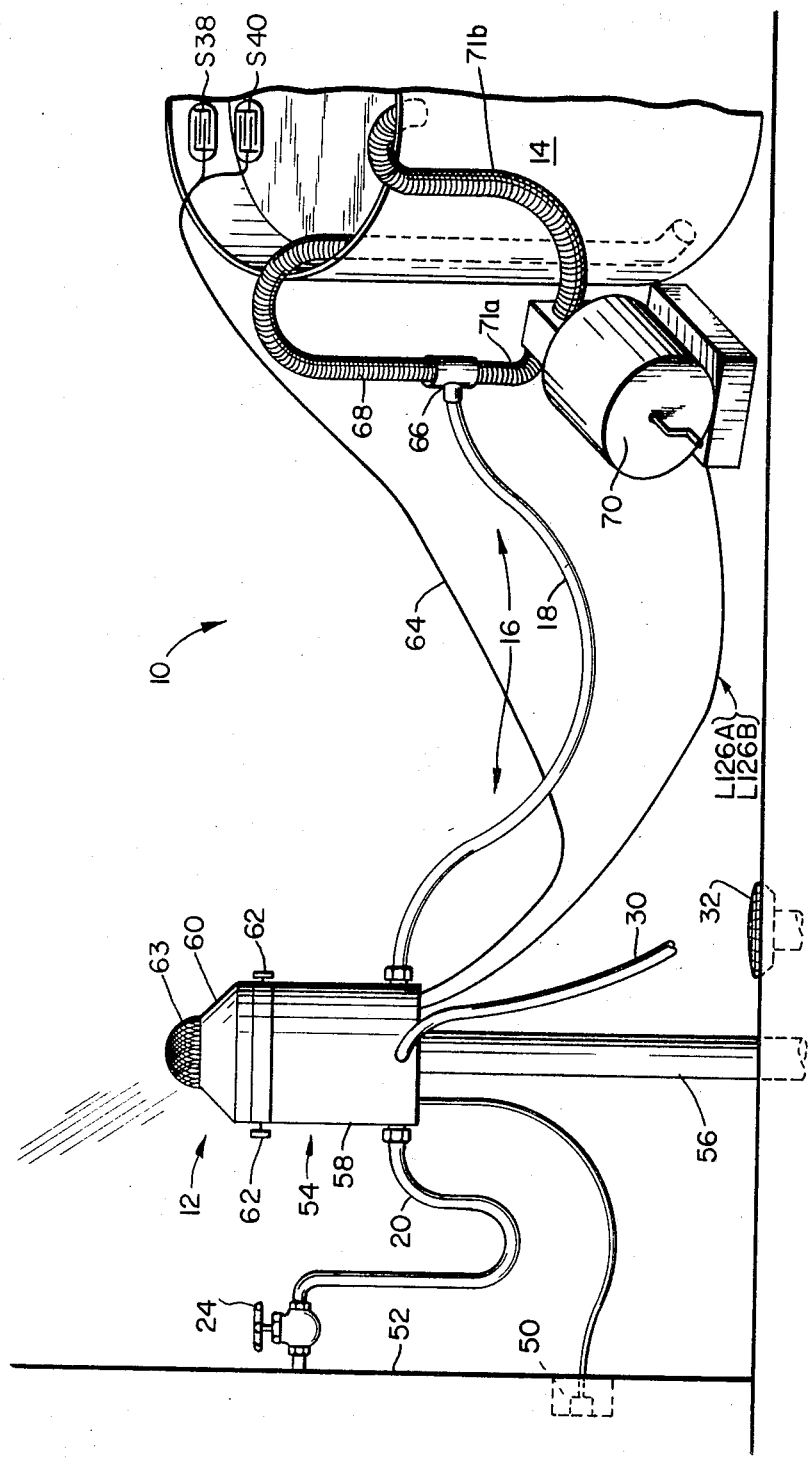
FIG. 1 is a somewhat pictorial illustration of an automatic fluid flow control system in accord with the principles of the present invention.
Figure 2:
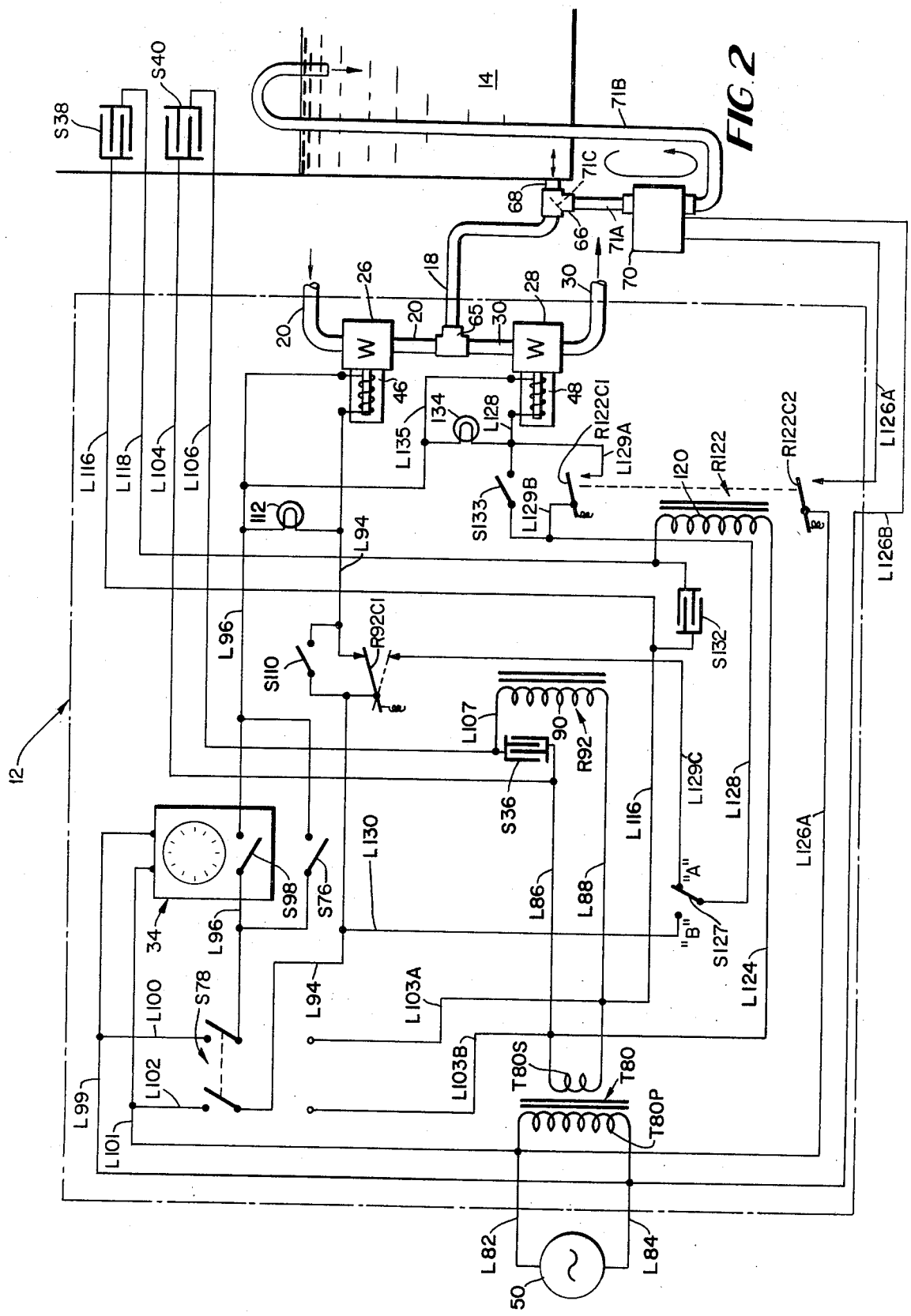
FIG. 2 is a schematic diagram of the automatic fluid flow control system of FIG. 1.

Referring now to the drawing, FIGS. 1 and 2 disclose a fluid flow control system 10 in accord with the principles of the present invention including a master control unit 12 for automatically controlling the flow of liquid into and from a reservoir 14 through a liquid distribution system 16.

The typical, illustrated distribution system 16 includes flexible conduits 18 and 20 connected between reservoir 14 and a faucet 24 or other source of water under pressure.

Also incorporated in the liquid distribution system are an electromagnetically actuated valve 26 in conduit 20 for controlling the flow of water into reservoir 14 and a valve 28 of similar character in a conduit 30 for controlling the flow of water out of the reservoir via conduits 18 and 30 int a drain 32 or an additional reservoir or receptacle (not shown).

Master control unit 12 controls the flow of water to reservoir 14 by effecting the opening and closing of valves 26 and 28 at the appropriate times and for the proper lengths of time. The master control unit in similar fashion also controls the flow of water from reservoir 14 to drain 32.

As best shown in FIG. 2, the major components of master control unit 12 include a timer 34, a planimetric rain switch S36, the maximum and minimum level control planimetric switches S38 and S40. The timer and planimetric switches are electrically connected to the electromagnetic actuators or solenoids 46 of valve 26 and 48 of valve 28 and to a source 50 of AC voltage. This source may be an outlet on an exterior building wall 52 (see FIG. 1).

The components of master control unit 12 just described, together with valves 26 and 28, are housed in a casing 54 mounted above ground level on a stanchion 56.

Figure 3:
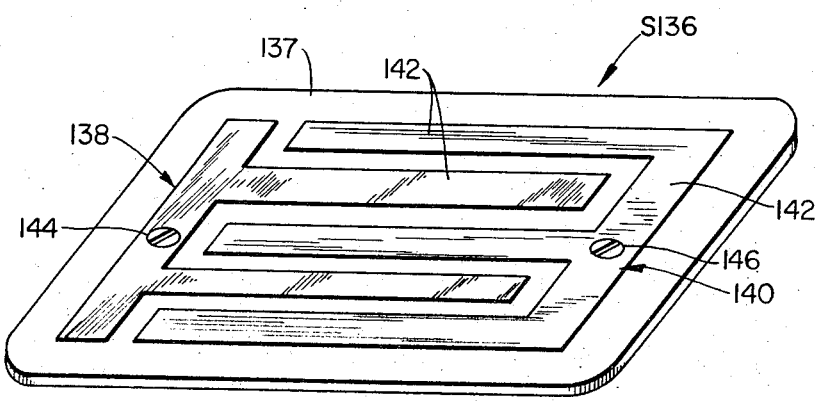
FIG. 3 is a perspective view of a novel planimetric switch employed in the system of FIG. 1 and incorporated in the master control unit thereof.

Casing 54 includes a lower cylindrical member 58 to which a frustoconical upper member 60 is detachably fixed by fasteners 62. Mounted on the upper end of casing member 60 beneath a perforate cover 63 and oriented horizontally with its conductive members facing upwardly like the switch shown in FIG. 3 is planimetric rain switch S36.

Liquid level controlling planimetric switches S38 and S40 are located in reservoir 14 and are connected to the master control unit via leads housed in a conduit 64.

When the level of the liquid in reservoir 14 falls below the minimum level at which planimetric switch S40 is located and loses physical contact therewith, valve 26 is opened. With this valve open and valve 28 closed, water enters reservoir 14 via conduit 20, tee junction 65, conduit 18, tee junction 66, and conduit 68. The inflow to reservoir 14 continues until the liquid level reaches planimetric switch S40, except during periods of natural rainfall, when valve 26 will automatically close. Upon cessation of natural rainfall, valve 26 will automatically reopen; and filling will resume.

If heavy natural rainfall causes the liquid level in reservoir 14 to rise above the minimum level established by planimetric switch S40 to the maximum level established by planimetric switch S38, valve 28 will open; and swimming pool pump 70 will be activated. With valve 28 open and valve 26 closed, fluid will be pumped from reservoir 14 through conduit 68, tee junction 66, and conduit 18, tee junction 65, and outflow conduit 30 into drain 32. During this outflow operation, swimming pool filter pump 70 also operates in normal fashion to effect a continuous recirculation of water, under pressure, via conduit 68, tee junction 66, and conduits 71A and 71B. However, inserted in tee junction 66 is a divider 71C which diverts a portion of the recirculated water into conduit 18 and through tee junction 65, valve 28, and conduit 30 into drain 32 to lower the level of the fluid in reservoir 14.

The inflow and outflow will occur within the predetermined time interval set by timer 34 unless automatic mode switch S76 is closed. The inflow and outflow will occur upon demand by either or both of the planimetric switches S38 and S40.

Level responsive control over inflow and outflow during the timer intervals determined by timer 34 is hereinafter referred to as a "timed" mode of operation. The alternate mode of operation with switch S76 closed, in which the timer is bypassed and switches S38 and S40 are operative at all times to control inflow and outflow, is referred to as a "demand" or "automatic" mode of operation.

When the system is under the control of switch S76, outflow can be made dependent upon inflow; or flow under control of each of the two valves 26 and 28 may be made independent of each other. In the latter mode of operation, liquids flowing through conduits 20 and 68 can be combined and mixed in tee 65 and conduit 30.

A second switch S78 permits solenoids 46 and 48 to be operated on either high voltage from primary T80P of transformer T80 or low voltage from the transformer secondary T80S. This extends the versatility of the system since solenoid control valves may be selected on the basis of either high current/low voltage or low current/high voltage, depending upon the application of the flow control system.

Referring to both FIGS. 1 and 2, the voltage prsent at source 50 (typically, ordinary 110–120 volt, 60 cycle, AC) is applied through conductors L82 and L84 to the primary T80P of transformer T80. A low voltage is generated across the secondary coil T80S and applied via conductors L86 and L88 to solenoid coil 90 of relay R92 which is connected in series with the parallel combination of planimetric rain switch S36 and minimum level planimetric switch S40.

Solenoid coil 46 is energized to open valve 26 by voltage applied via conductors L96 and L94 through relay contact R92C1 and timer switch S98 from the double pole, double throw switch S78 where either high or low voltage may be selected.

High voltage is obtained at switch S78 from the primary of transformer T80P via conductors L99, L100, L101, and L102 while low voltage is obtained from the secondary of transformer T80S via conductors L103A and L103B.

Consequently, solenoid coil 46 is energized and valve 26 is opened when clock switch S98 is closed, and relay contact R92C1 is in the position shown in full lines in FIG. 2. This occurs when the solenoid coil 90 of relay R92 is de-energized.

With valve 26 open, water or other liquid flows into reservoir 14 through the path described above. Filling continues until the planimetric, minimum level switch S40 is closed by the rising liquid in reservoir 14. This causes relay R92 to be energized since it permits current to flow from transformer secondary T80S through conductor L86, conductor L104, switch S40, leads L106 and L107, relay solenoid coil 90, and conductor L88 back to the transformer secondary.

When relay R92 is energized, contactor R92C2 transfers to the position shown in dotted lines in FIG. 1 and breaks the continuity in conductor L94, interrupting current flow through solenoid coil 46 and causing valve 26 to close. Inflow of liquid from conduit 20 via conduits 18 and 68 into reservoir 14 consequently ceases.

Since planimetric rain switch S36 is connected in parallel with minimum level planimetric switch S40 across transformer secondary T80S, initiation of natural rainfall during the inflow cycle will also cause cessation of inflow.[1] The closing of planimetric switch S36 causes relay coil 90 to be energized, thereby transferring contact R92C1 to the FIG. 2 dotted line position and interrupting the continuity in conductor L94. This de-energizes solenoid coil 46 and causes valve 26 to close, terminating the inflow of liquid from conduit 20.

[1] In other applications of the invention planimetric switch S36 can be made responsive to other parameters; e.g., the liquid level in a different receptacle or reservoir. Or it may be replaced with a different type of sensing device responsive to pressure, mechanical movement, etc.

If the liquid level in reservoir 14 has not reached the minimum level planimetric switch S40 when natural rainfall ceases, switch S36 will open; and inflow will continue until either planimetric switch S40 is reached by the rising liquid or the timing interval determined by timer 34 is completed and timer switch S98 opens, interrupting the continuity in lead L96.

If automatic or demand switch S76 is closed, timer switch S98 is bypassed; and the system is no longer controlled by timer 34. In this mode of operation, referred to as the "automatic mode," inflow will occur upon demand by planimetric switch S40 unless rejected by planimetric switch S36.

Manual control of inflow may be exercised by closing switch S110 in addition to switch S76. Switch S110 bypasses relay contactor R92C1, and closing it will cause solenoid coil 46 of valve 26 to be energized as described above. If switch S110 is closed but switch S76 is left open, manual control over inflow can still be exercised, but only within the period determined by timer 34.

Indicator light 112 is connected across conductors L94 and L96 and therefore lights when solenoid coil 46 is energized. Thus, this light indicates when inflow is occurring.

Referring now both to FIGS. 1 and 2, it is quite possible that an excess inflow of liquid into reservoir 14 could occur. For example, with the liquid level properly adjusted to the level of minimum level switch S40, a heavy rainfall could cause the level of the liquid to rise above this level in an outdoor swimming pool. In fact, sufficient extraneous inflow to cause reservoir 14 to overflow in an undesired manner could occur in such circumstances.

To prevent this, the automatic fluid level control system is provided with an outflow control mode. In the outflow mode the control is by a maximum level planimetric switch S38 placed in the reservoir at the desired level above which outflow is to occur.

When the level of the liquid in reservoir 14 reaches maximum level planimetric switch S38 and the switch closes, current flows from transformer secondary T80S through conductors L88 and L116, switch S38, conductor L118, solenoid coil 120 of relay R122, and conductors L124 and L86 to secondary coil T80S. This energizes relay R122, closing contactor R122C1 and permitting current to energize solenoid 48 of valve 28 through one of the circuits discussed below. This causes the valve to open.

Outflow then occurs from reservoir 14 through conduit 68, tee 66, conduit 18, tee 65, valve 28, and conduit 30 into drain 32.

Since the fluid in reservoir 14 may not be under pressure, as in the case of an outdoor swimming pool of the backyard variety, relay R122 is equipped with a second contactor R122C2. When contactor R122C1 closes, the second contactor R122C2 also closes.

With contactor R122C2 closed, voltage is supplied to the swimming pool filter pump 70 through leads L82, L126A and L126B, L84. This energizes pump 70, which places outflow liquid in conduits 68 and 18 under pressure. When outflow ceases, filter pump 70 stops since contactor R122C2 opens, interrupting the continuity in lead L126A.

As heretofore indicated, flow under the control of valves 26 and 28 can be initiated and terminated substantially instantaneously and can be effected independently or simultaneously. This versatility is attributable to the unique manner in which solenoid 48 of valve 28 is energized through relay R92; viz, by sequence switch S127, which has two operating positions. In switch position "A," one of the two flow controlling valves 26 and 28 is caused to remain closed while the other of the valves is open. Thus, with switch S127 in position A, liquid can flow from conduit 20 into tank 14 or from tank 14 into conduit 30; but flow through both conduits 18 and 20 into tee 65 and conduit 30 cannot occur.

With relay R92 energized and contact R92C1 in the dotted line position, operating voltage for solenoid coil 48 of valve 28 is taken from switch S78 via conductors L96, L135, L128, L129A, relay contactor R122C1 and leads L129B and L128 to sequence switch S127. In position A, the return to switch S78 is via leads L129C, relay contactor R92C1 and lead L94, thus making voltage available to coil 48 only when both relays R92 and R122 are energized. Since relay R92 must be energized to terminate inflow, outflow is dependent upon cessation of inflow.

In position "B," voltage is returned to switch S78 directly via conductor L130, which bypasses relay R92. Both relay R92 and relay R122 may then operate independently; and inflow and outflow can occur at the same time.

An auxiliary planimetric switch S132 permits outflow to be continued after planimetric switch S38 opens by keeping relay R122 energized until it opens.[2] This switch, which is connected in parallel with switch S38 across leads L116 and L118, even further increases the capabilities of the novel systems disclosed herein. For example, switch S132 or a plurality of like connected planimetric switches permits a series of reservoirs to be level controlled in a logical sequence.

[2] Also, as in the case of planimetric switch S36, switch S132 can be replaced with a switch responsive to a condition other than liquid level.

In the cases described so far, outflow is limited to the duration of the timing cycle and interval of timer 34 since solenoid 48 receives energy from the conductors L96 and L135 in series with timer switch S98. Fully automatic control is also available as in the case of inflow. Automatic control is accomplished by closing switch S76, which bypasses clock switch S98. In the automatic mode outflow occurs when demanded by planimetric switches S38 and S132.

In the simultaneous inflow/outflow mode of operation, which can be obtained with switch S127 in position B, fluid from reservoir 14 can be combined or mixed with fluid entering conduit 18, the mixture being removed via conduit 30. This is useful in the mixing of industrial chemicals, for example.

Planimetric switches S36, S40 and S132 may also be adjusted to produce a sequence of operations in which an inflow/outflow cycle may be sequentially repeated using a plurality of reservoirs for storage, mixing and restorage. In this type of application, one or more of the planimetric switches may again be replaced with other types of sensors to extend the utility of the system.

Outflow can be made to occur manually as well as automatically upon demand or within a given time period. This is accomplished by closing switch S133.

Switch S133 is connected around relay contactor R122C1 in lead L128. Accordingly, with switch S133 closed, solenoid 48 of valve 28 is connected to one side of high/low voltage switch S78 as described above. The return path is through lead L128, switch S133, switch S127, and leads L130 and L94 to switch S78. With switch S127 in the B position, outflow will occur until switch S133 is opened, independently of the opening and closing of valve 26, as switch S127 is then connected directly to the other side of switch S78 through leads L130 and L94.

With switch S133 closed and switch S127 in the A position, switch S127 is connected to switch S78 through relay contactor R92C1 as discussed above. Thus, with switch S127 in the A position and switch S133 closed, outflow will occur whenever inflow ceases and will continue until inflow resumes, giving still further versatility to the system.

Also, switch S133 can be closed and switch S76 left open. This permits manual control to be exercised over outflow but only during the periods determined by timer 34.

An indicator lamp 134 is connected across leads L128 and L135 in parallel with solenoid 48. Accordingly, the lamp will be lighted whenever solenoid 48 is energized and outflow is occuring. The extra dimension of control afforded by any of the switches employed in the embodiment of the invention described above can be eliminated if unnecessary or not wanted by deleting or disabling the switch which provides that control.

FIG. 3 shows in perspective a planimetric switch S136 of the type identified in the preceding discussion by reference characters S36, S38, S40, and S132. The switch consists of an insulated base 137 on which two spaced apart, conductive members 138 and 140 are formed. Each conductive member has interleaved electrode fingers 142 which can be bridged with only a thin film of liquid to provide continuity between terminals 144 and 146.

Figure 4:
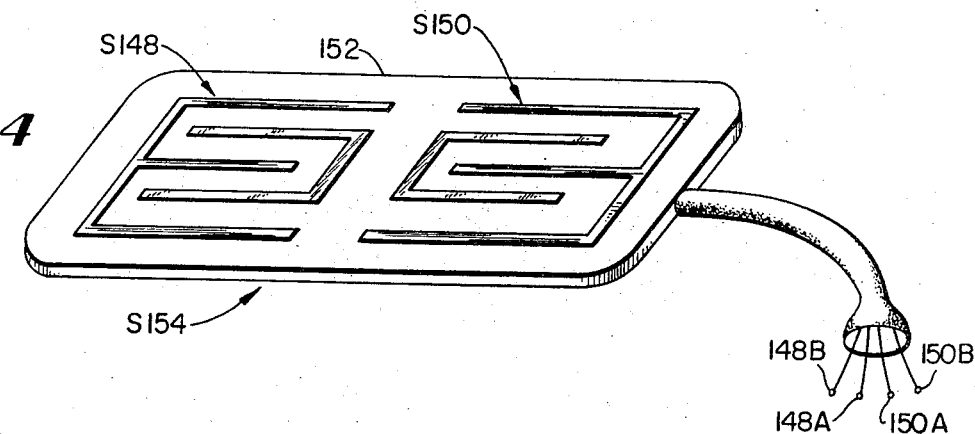
FIG. 4 is a perspective view of a planimetric type switching device which includes multiple switches and can, accordingly, be substituted for plural individual switches of the type shown in FIG. 5 in many applications of the present invention.

Because these switches may be easily produced by printing or chemical etching, two (or more) switches S148 and S150 may be printed on a common base 152 as in the switching device S154 shown in FIG. 4. This type of switching device can be substituted for the two switches S38 and S40 shown in FIG. 2.

In this application, the terminals 150A and 150B of switch S150 would be connected to leads L116 and L118 of the circuitry shown in FIG. 2. Terminals 148A and 148B of switch S148 would be connected to leads L104 and L106.

Figure 5:
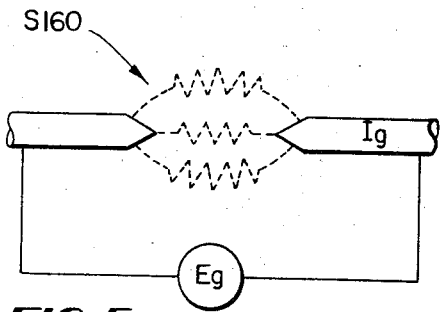
FIGS. 5 and 6 show the current paths in conventional volumetric switches of the single and concentric conductor types.
Figure 6:
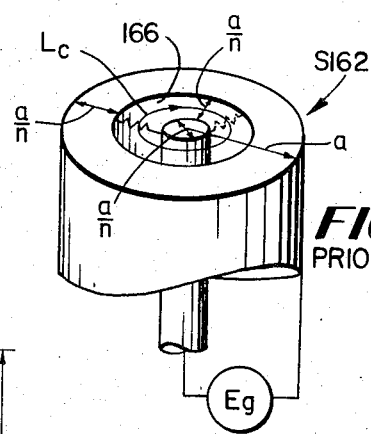

The salient advantages of the planimetric switch can best be understood by comparing it with conventional level responsive switches such as an ordinary single conductor gap switch (S160 in FIG. 5) and a concentric conductor gap switch (S162 in FIG. 6).

A planimetric switch (S164 in FIG. 7) differs from conventional volumetric switches including those shown in FIGS. 5 and 6 in that the circuit completing current flow lies within a thin electrolytic film of liquid extending between the conductors.

In volumetric switches the current flow is through a body of liquid between two electrodes. If the requisite volume of liquid is not present, switching cannot occur. If it is present, its removal (after switching has occured) is a problem as discussed above.

FIGS. 5 and 6 also make it clear that conventional switches do not necessarily have to be of mechanical character to be the volumetric type. The concentric conductor switch S162 shown in FIG. 6 is volumetric with concentric cavity 166 opened to electrolyte as is the switch S160 shown in FIG. 5.

The uniqueness of the planimetric switch lies in its essentially two-dimensional characteristics — the switch electrodes are of thin-film thickness, yet have a sufficiently large contact surface area (due to their unique planimetric length) to provide almost instantaneous circuit completion and interruption when contacted by liquid and when the liquid level falls below the level at which the switch is positioned.

In any switching circuit it is desirable to have a maximum gap resistance $R_g$ prior to gap breakdown and minimum resistance immediately following gap breakdown when conduction begins. In the case of the ordinary single conductor gap switch S160 shown in FIG. 5, there is but one path of least gap resistance in any given plane. Thus:

$$Eg = Ig\ Rg$$

The gap switching voltage $Eg$ is a function of the gap resistance $Rg$ and gap current $Ig$.

In the case of the concentric conductor gap switch S162 shown in FIG. 6, there are a greater number of least resistance paths extending radially across the gap, and:

$$Eg = Ig\ Rg_{(total)}$$

Figure 7:
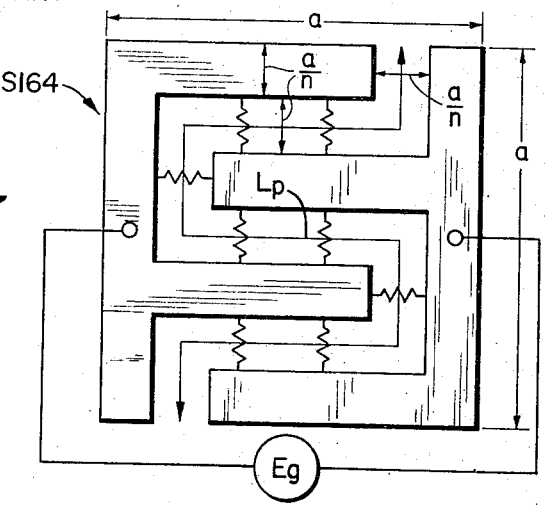
FIG. 7 shows the current paths in a planimetric switch as employed in the novel flow control systems disclosed herein.

In the case of the planimetric switch S164 shown in FIG. 7, there are an infinite number of parallel least resistance paths in the switch gap; and $$Eg = Ig\ Rg_{(total)}$$

Since these least resistance gaps are in parallel:

$$Rg_{(total)} = 1/(1/Rg_1 + 1/Rg_2 + 1/Rg_3 + \ldots 1/Rg_n) = (1/n)Rg_n$$

As $n$ is far greater, the total gap resistance of planimetric switch S164 is only $1/n$ that of switch S160. It is also far less than that of switch S162, for realistic coaxial diameters, as can be seen from FIGS. 6 and 7 and the following comparison of a planimetric switch of dimensions a by a and a concentric gap switch of diameter $a$.

If $L_p$ defines the total length of the least resistance paths for the planimetric switch of FIG. 7, and $L_c$ the total length of the least resistance paths in the switch S162 of FIG. 6, the following expressions for $L_p$ and $L_c$ may be written:

$$L_p = a/n\ (n-1)/2\ (n+\pi-3) \quad \text{planimetric}$$

$$L_c = \pi a/n\ (n-2) \quad \text{coaxial gap}$$

Thus:

$$L_p/L_c = (n+\pi-3)/2\pi\ (n-1)/(n-2)$$

As shown by the table I below, $L_p$ exceeds $L_c$ for values of $a/n$ greater than 1:4 by a margin which increases considerably faster than this last ratio.[3] This is important because the novel control systems disclosed herein employ in applications involving liquids planimetric switches in which the ratio $a/n$ is anywhere from 1:20 to 1:100, providing a degree of control which is from 3 to 15 times as sensitive as a coaxial switch.

[3] For planimetric switches having gap widths which exceed the electrode width, the planimetric switch is even more sensitive than the switch shown in FIG. 7 in which the electrode and gap widths are equal.

In applications involving the closing of the switch by a saturated gas or vapor, planimetric switches having a ratio $a/n$ of from 1:100 to 1:1000 can be employed. These switches are from 20 to 2,000 times as sensitive as comparable concentric gap switches.

Table I

| $a/n$ | $L_p/L_c$ |
| --- | --- |
| 1/4 | .99 |
| 1/8 | 1.51 |
| 1/10 | 1.82 |
| 1/20 | 3.39 |
| 1/50 | 8.15 |
| 1/100 | 16.1 |
| 1/500 | 80.0 |
| 1/1000 | 160 |

To maintain the same gap current $Ig$, a much lower gap voltage $Eg$ is required in the case of the planimetric switch as compared to the more conventional switches. This not only enables the proposed control system to achieve far greater sensitivity, but also permits it to operate at lower voltages, which also reduces electrical shock hazard.

Further, in the case of the planimetric switch, fluid flowing onto and from the surface of the switch produces a practically instantaneous opening or closing of the switch, dependent only upon the presence or absence of liquid.

Finally, the recovery time of the switching circuit is almost instantaneous. As soon as the switch opens it can again be closed.

The materials of which planimetric switch base 137 and electrode members 138 and 140 are made may be custom selected to adapt the switch to different applications. For example, Teflon may be selected for base 137 material in high temperature applications.

Thus, the use of planimetric switches allows the automatic fluid level control system described above to accomplish switching functions in a manner and at a speed that has not been possible in heretofore available systems. The automatic fluid level control system has an extremely fast reaction time; and it will operate almost instantaneously upon the first contact of liquid with its planimetric switches.

Another important feature of my novel system is the use of the stepdown transformer T80 and sensitive relays R92 and R122 in series with planimetric switches S36, S38, S40, and S132 to control the continuity of the circuit to valve actuators 46 and 48. As switch S36 must be exposed to the atmosphere and planimetric switch S40 to swimming pool water to operate effectively in the exemplary application of the invention, safety considerations dictate that the operating voltage and flow of current be as low as possible. Because of their lower current requirements, the planimetric switches permit the use of a transformer T80 or other high impedance voltage reducing device which will provide maximum coil resistance and minimum voltage and current.

Shock hazard may also be reduced by making conduits such as 18, 20, 30, and 64 electrically conductive, which will absolutely ground master control unit 12. In addition to minimizing electrical shock hazards from the exposed planimetric switches this arrangement prevents excitation transients across the planimetric switches due to the collapsing of the magnetic fields in the coils of relays R92 and R122 and in the coils of actuators 46 and 48.

Typically, transformer T80 will have a turns ratio of from 10:1 to 20:1 with resistance optimized for minimum current flow. This is not critical, however, and will vary depending upon the electrical characteristics of the remaining circuit components.

From the foregoing, it will also be apparent to those skilled in the relevant arts that the principles of the present invention may be employed to control the operation of systems other than fluid control systems which require time control and sensing switch responsive means. A typical system, for example, would be the control of and/or mixing of semi-electrically conductive gases under pressure in closed reservoirs or tanks.

As a final example of the versatility of the present invention, it will be apparent to those skilled in the art to which it pertains that, in applications of the type just described, the planimetric switches may be replaced with switches responsive to pressure, humidity, temperature, ionization, and other parameters as was to some extent discussed above. Thus, the invention is adaptable to many applications requiring pumping and/or flow control regulated by time or demand and one or more additional parameters.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalents of the claims are therefore intended to be embraced therein.

What is claimed and desired to be secured by Letters Patent is:

1. The combination of a receptacle and means for controlling the level of the liquid in said receptacle, comprising: a fluid conduit means communicating with said receptacle; valve means for controlling the flow of fluid through said conduit means; valve actuating means operable in a first mode of operation to actuate said valve means automatically upon a change of the level of fluid in the receptacle at any time, said valve actuating means being operable in a second mode of operation to actuate said valve means upon a change of the level of fluid in the receptacle within a selected time period, and said valve actuating means being operable in a third mode of operation to actuate the valve means at any time and irrespective of whether there is a change in the level of fluid in the receptacle; and means for selecting the one of said first, second, and third modes in which it is desired that said valve actuating means be operable.

2. The combination of claim 1, together with means for pumping the fluid through the conduit means and wherein said valve actuating means includes means for actuating said pumping means at the same time that it actuates the valve to a condition in which fluid can flow through said conduit means.

3. The combination of claim 1, wherein said valve actuating means includes a sensing means responsive to a condition other than the level of the liquid in the receptacle which is operable in at least one of said first and second modes of operation of said actuating means to control the actuation of the valve means.

4. The combination of claim 3, wherein said sensing means is responsive to the presence of a conductive fluid thereon to effect actuation of said valve means.

5. The combination of claim 1, wherein said valve actuating means includes electrically operated control circuitry and including means which is selectively operable to supply at least two different operating voltages to said circuitry.

6. The combination of claim 1, wherein said valve means includes an electrically operated actuator and wherein said valve actuating means includes a manually operable switch for completing a circuit between said actuator and an electrical power source in the third of the modes of operation of said valve actuating means.

7. The combination of a receptacle and means for controlling the level of fluid in said receptacle, which comprises: a fluid conduit means communicating with said receptacle; an electrically operated means which, when actuated, will result in a flow of fluid through said conduit means; means for actuating said electrically operated means upon a change in the level of fluid in the receptacle which includes a planimetric switch means located in said receptacle; and means including a detector responsive to a change in a variable fluid condition other than the level of the fluid in the receptacle for automatically overriding said planimetric switch means and thereby altering the operation of the electrically operated means upon the occurrence of a change in said variable condition.

8. The combination of claim 7, wherein the condition responsive detector included in the means for overriding said planimetric switch means and thereby altering the operation of the actuating means is a planimetric switch means located other than in the receptacle.

9. The combination of claim 7, wherein said actuating means also includes a timer for limiting the periods in which said electrically operated means can be actuated.

10. The combination of claim 9, together with means for bypassing said timer.

11. The combination of a receptacle and means for controlling the level of liquid in said receptacle, comprising: a fluid conduit means communicating with said receptacle; electrically operated means which, when actuated, will result in a flow of fluid through said conduit means; actuating means operable in a first mode of operation to actuate said electrically operated means automatically upon a change of the level of fluid in the receptacle at any time, said actuating means being operable in a second mode of operation to actuate said electrically operated means upon a change of the level of fluid in the receptacle within a selected time period, and said actuating means being operable in a third mode of operation to actuate the electrically operated means at any time and irrespective of whether there is a change in the level of fluid in the receptacle; and means for selecting the one of said first, second, and third modes in which it is desired that said actuating means be operable.

12. The combination of a receptacle and means for controlling the level of liquid in said receptacle, comprising: a fluid conduit means communicating with said receptacle; electrically operated means which, when actuated, will result in a flow of fluid through said conduit means; a first control means operable to actuate said electrically operated means automatically upon a change of the level of the fluid in the receptacle; a second control means operable independently of the level of the fluid in the receptacle for overriding the operation of the first control means; a third, control means for establishing and/or limiting the periods during which said first control means is operable to actuate the electrically operated means; and means which can be selectively actuated to make said third control means inoperable without making the first or second control means inoperable or changing the operational relationship therebetween.

13. The combination of a receptacle and means for controlling the level of liquid in said receptacle, comprising: a fluid conduit means communicating with said receptacle; electrically operated means which, when actuated, will result in a flow of fluid through said conduit means; a first control means operable to actuate said electrically operated means automatically upon a change of the level of the fluid in the receptacle; a second control means operable independently of the level of the fluid in the receptacle for overriding the operation of the first control means; a third, selectively actuatable timer means for establishing and/or limiting the periods during which said first control means is operable to actuate the electrically operated means; and a fourth control means for bypassing said first, second, and third control means to provide manual control over the actuation of said electrically operated means.

\* \* \* \* \*

PO-1050
(5/69)

UNITED STATES PATENT OFFICE
CERTIFICATE OF CORRECTION

Patent No. 3,848,616          Dated November 19, 1974

Inventor(s) George E. Sanner

It is certified that error appears in the above-identified patent and that said Letters Patent are hereby corrected as shown below:

Column 1, line 19, change "priviate" to --private--.

Column 3, line 10, change "envionments" to --environments--.

Column 4, line 5, after "that" insert --exist--.

Column 5, line 47, change "int" to --into--.

Column 6, line 42, change "The" to --Then--.

Column 7, line 1, change "prsent" to --present--.

Column 9, line 3, change "A" to --"A"--.

Column 11, Footnote 3, line 2, change "wdith" to --width--.

In the heading "Inventor:" after "Cypress Hill," insert --Sparks--.

In the heading "Attorney, Agent, or Firm" change "Hies" to --Nies--.

Signed and sealed this 28th day of January 1975.

(SEAL)
Attest:

McCOY M. GIBSON JR.          C. MARSHALL DANN
Attesting Officer          Commissioner of Patents